G. E. SAVAGE.
CHAFING DISH STAND.
APPLICATION FILED DEC. 26, 1911.
1,030,019.
Patented June 18, 1912.
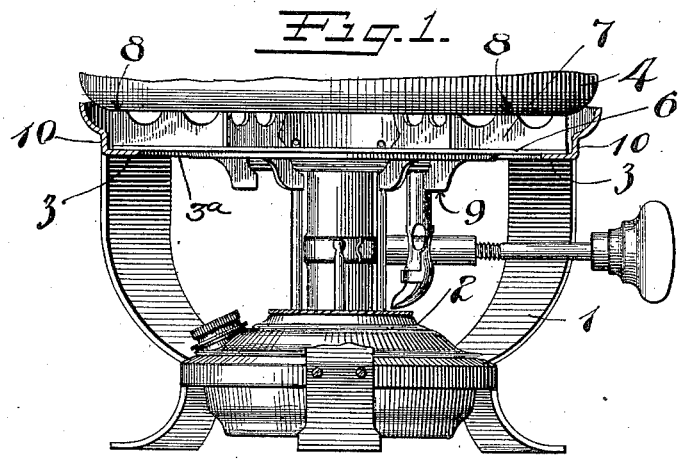
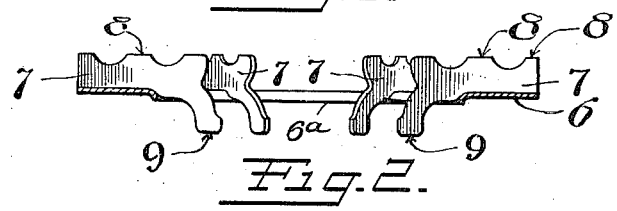
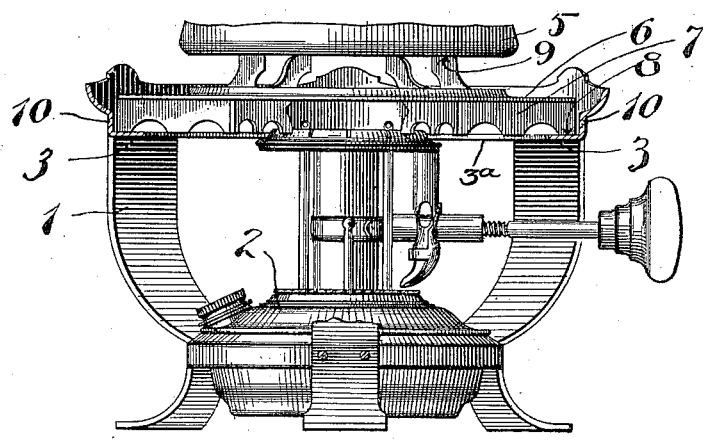
Witnesses:
Chas W Peard
Ida M Hunziker
Inventor
G. E. SAVAGE
By his Attorneys

UNITED STATES PATENT OFFICE.

GEORGE E. SAVAGE, OF MERIDEN, CONNECTICUT, ASSIGNOR TO MANNING, BOWMAN & COMPANY, OF MERIDEN, CONNECTICUT, A CORPORATION OF CONNECTICUT.

CHAFING-DISH STAND.

1,030,019.  Specification of Letters Patent.  Patented June 18, 1912.

Application filed December 26, 1911. Serial No. 667,983.

*To all whom it may concern:*

Be it known that I, GEORGE E. SAVAGE, a citizen of the United States, residing at Meriden, New Haven county, State of Connecticut, have invented certain new and useful Improvements in Chafing-Dish Stands, of which the following is a full, clear, and exact description.

My invention relates to improvements in chafing dish stands.

The object of the invention is to provide a simple and effective device for adapting the apparatus for use in connection with the cooking to be done in a chafing dish pan or the cooking to be done in a smaller dish or receptacle, such as a coffee pot or percolator. In the first instance it is desirable to get a broad flame which spreads well over the underside of the pan, whereas, in the second instance it is desirable to concentrate the flame in a relatively smaller area.

In the drawings, Figure 1 is a side elevation on a relatively reduced scale and partly in section of certain parts of a chafing dish including a pan, stand and lamp, certain parts being shown in section, the upper part of said pan being broken away. Fig. 2 is a similar view, a coffee pot being substituted for the pan. Fig. 3 is a cross sectional view of a detached detail.

1 represents a stand of any approved pattern and designed in this instance to hold a lamp 2.

3 is a supporting shoulder on the stand extending around a flame opening 3ª.

4 represents the base of a chafing dish pan.

5 represents the base of a coffee pot, percolator or other cooking dish, the area of the bottom of the same being less than the area of the bottom of the pan 4.

It is desirable when a chafing dish pan is to be supported upon the stand and above the lamp to cause the flame of the lamp to spread over a substantial part of the bottom of said pan, and this is accomplished by supporting said pan in such close proximity to the base of the flame that the force of the flame causes the same to spread well out over the underside of said pan. When it is desired to get a more concentrated flame, as in the case where a smaller cooking utensil is to be used, such as a coffee pot or percolator 5, this end is attained by supporting said cooking device at a higher elevation than the chafing dish pan first referred to. To illustrate: If the pan is arranged at the elevation shown in Fig. 1, the force of the flame will cause a wide spread thereof under the bottom of said pan; whereas if the pot 5 is elevated as shown in Fig. 2 so as to stand considerably higher, the flame will be more concentrated and have less spread, even though the adjustment of the lamp is not altered. My invention in this case, therefore, relates to a simple means for changing the elevation of the said cooking utensils relatively to the lamp burner to secure the desired results without necessarily altering the adjustment of the lamp itself.

The improvement in a preferred form comprises a ring or annular frame 6 arranged to rest upon the shoulder 3. The center of the ring is open as at 6ª to afford passage for the flame from the burner of the lamp 2. In connection with the flame, I provide two seats 8 and 9. These seats are preferably formed on double ended members 7 which are arranged radially around the ring. A sufficient number of these members 7 are provided to afford a firm but substantial seat for the pan or dish to be supported upon. The seat 8 is, as will be observed, of substantial area and extends well out to the side of the frame 1 so as to give a broad support for the pan 4; whereas, the seat 9 is narrower or of less area, being especially adapted to support a cooking utensil, the bottom of which is of less width than the bottom of the usual pan; for example, to support such a utensil as a coffee pot or percolator. The area of the seat 9 is such that those parts constituting said seat may pass down through the opening or space surrounded by the support or shouldered part 3 of the stand 1; whereas the width of the seat 8 is such that it projects over said shouldered portion 3. As a result of the foregoing construction, it will be seen that the ring or frame 6 with its seats 8 and 9 respectively on opposite sides thereof may be reversed so that in one instance, for example as shown in Fig. 1, the ring 6 will rest directly upon the shoulder 3 and when reversed, for example as shown in Fig. 2, the ring 6 will rest indirectly upon said shoulder 3, being elevated somewhat above said shoulder by the intervening parts of the member 7 which constitute the seat 8. When in this reversed position, as before indicated, the seat 9 will occupy a higher position than previously occupied by the seat 8. By this simple shifting of the parts, involving merely the reversal thereof, the cooking utensil may be elevated more or less relatively to the lamp burner as the particular exigencies require.

Any suitable centering means may be provided to prevent lateral displacement of the reversible dish support. For example, the side of the stand may be elevated as at 10 around the supporting shoulder 3 and sufficiently close to the ring 6 and the parts associated therewith to guarantee the proper centering of the same.

While I have shown the invention in its preferred form, it is obvious that it may be modified in a variety of ways.

What I claim is:

1. In a device of the character described, a stand having a seat thereon, a burner adjacent thereto, a reversible dish-supporting member arranged to be supported on and above said seat having two utensil seats arranged on opposite sides thereof, and having a central flame opening therethrough.

2. In a device of the character described, a stand having a seat thereon, a burner adjacent thereto, a reversible dish-supporting member arranged to be supported on and above said seat having two utensil seats arranged on opposite sides thereof, and having a central flame opening therethrough, the utensil seat portion on one side being sufficiently wide to rest upon said stand seat when said reversible member is in one position.

3. In a device of the character described, a stand having a seat thereon, a burner adjacent thereto and a reversible dish-supporting element coöperating with said seat and arranged to support a cooking utensil at two different elevations relatively to said seat and burner.

4. In a device of the character described, a stand having a seat thereon, a burner adjacent thereto a reversible dish-supporting element coöperating with said seat and arranged to support a cooking utensil at two different elevations relatively to said seat and burner, and centering means for said reversible dish-supporting element.

5. In a device of the character described, a stand having a seat thereon, a burner adjacent thereto, and a reversible dish-supporting frame having projections above the same forming a seat for a cooking utensil, and having projections below the same forming a second seat for a cooking utensil, the width of one seat being less than the width of the other seat.

6. In a device of the character described, a stand having a seat thereon, a burner adjacent thereto, a reversible utensil support coöperating with said seat and including an annular frame having a seat projecting above the same and forming a support for a cooking utensil, and having a second seat projecting below said frame and forming a second utensil support of less width than the first.

7. In a device of the character described, a stand having a seat thereon, a burner adjacent thereto, a reversible utensil support coöperating with said seat and including an annular frame having seat members projecting above the same and forming a support for a cooking utensil, and having seat members projecting below the same forming a second utensil support of less width than the first, said seats being arranged radially around said frame.

8. A reversible dish support for a chafing dish stand including a stand having a seat thereon and a burner adjacent thereto, an annular frame coöperating with said seat and having means projecting thereabove and forming a utensil seat, and having other means projecting therebelow to form a second utensil seat, the annular frame portion resting directly upon said stand seat when in one position, and being indirectly supported by said seat when reversed.

GEORGE E. SAVAGE.

Witnesses:
EDWARD A. FARR,
JOHN A. STERNBERG.

Copies of this patent may be obtained for five cents each, by addressing the "Commissioner of Patents, Washington, D. C."